United States Patent [19]

Madderra

[11] 4,376,405
[45] Mar. 15, 1983

[54] AUTOMATIC HARD-SOFT ROCKET DETENT SYSTEM

[75] Inventor: Jimmy M. Madderra, Huntsville, Ala.

[73] Assignee: The United States of America as represented by the Secretary of the Army, Washington, D.C.

[21] Appl. No.: 240,701

[22] Filed: Mar. 5, 1981

[51] Int. Cl.³ ............................................. F41F 3/04
[52] U.S. Cl. ................................... 89/1.806; 89/1.816
[58] Field of Search ............... 89/1.806, 1.807, 1.812, 89/1.816, 1.818; 403/316, 317, 318

[56] References Cited

U.S. PATENT DOCUMENTS

| | | | |
|---|---|---|---|
| 3,412,640 | 11/1968 | Nash | 89/1.806 |
| 3,754,726 | 8/1973 | Rusbach | 89/1.806 X |
| 3,780,616 | 12/1973 | Rusbach | 89/1.807 X |
| 3,960,054 | 6/1976 | Looger | 89/1.816 |
| 3,961,556 | 6/1976 | Clodfelter | 89/1.816 |
| 4,132,150 | 1/1979 | Conn | 89/1.806 |
| 4,191,087 | 3/1980 | Campbell et al. | 89/1.806 |

*Primary Examiner*—David H. Brown
*Attorney, Agent, or Firm*—Nathan Edelberg; Robert P. Gibson; Harold W. Hilton

[57] ABSTRACT

An automatic hard-soft detent system for releasably retaining a missile in a telescoping launcher/carrier. The system includes a detent that is a beam spring having a projection thereon that is rigidly held in engagement with a detent groove in the missile by a ramp or tapered surface on the inner launch tube when the launcher is collapsed in the carry mode. When the tubes are extended, the tapered surface is moved from under the projection and the projection is held in the detent groove by spring tension. The detent projection is completely released from the detent groove responsive to forward motion of the ignited missile after the launcher/carrier has been extended to the launch position.

3 Claims, 4 Drawing Figures

AUTOMATIC HARD-SOFT ROCKET DETENT SYSTEM

DEDICATORY CLAUSE

The invention described herein may be manufactured, used, and licensed by or for the Government for governmental purposes without the payment to me of any royalties thereon.

BACKGROUND OF THE INVENTION

In some missile systems, the missile is fired from a telescoping launcher/carrier. The missile is retained in the launcher/carrier until fired, by a series of detent fingers engaging a groove in the aft end of the nozzle and a restrictor ring on the launcher. The detent fingers are held in place by a detent disc that blows out and releases the detent fingers when the missile is fired.

Tests have been that the detent disc, along with the detent fingers, causes the noise level of the system to exceed the allowable limit. Furthermore, the detent fingers and fragments of the detent disc, when blown to the rear by the rocket motor blast, fail the requirement that no debris penetrate one-half inch of Cellotex at ten meters. The automatic hard-soft detent systems of the present invention has no debris and no detent disc and the noise level is maintained below the allowable limit.

SUMMARY OF THE INVENTION

An automatic hard-soft rocket detent system including a detent assembly comprised of a housing mounted in the outer launch tube and supporting a beam spring having a projection for rigidly engaging a groove in the aft end of the rocket motor when the launcher is collapsed in the carry mode. A ramp (tapered surface) is provided on the end of the inner launch tube which is retained in the outer launch tube in launch and carry modes, the ramp of the inner launch tube hardens the detent by engaging the bottom surface of the projection and extending the projection into the rocket motor groove for rigidly maintaining the projection in the groove. Responsive to the inner launch tube being extended the detent system is automatically softened when the ramp is moved from under the detent projection.

DESCRIPTION OF THE PREFERRED EMBODIMENT

Figure 1:
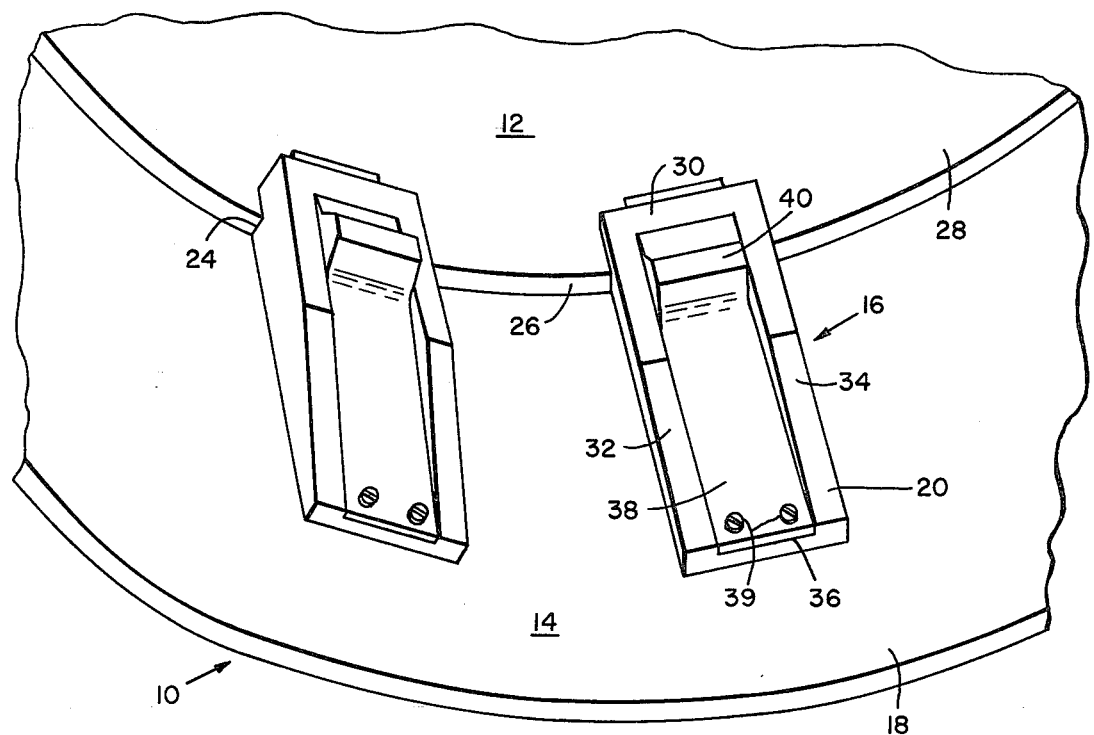
FIG. 1 is a partial view of the aft end of the missile launcher carrier showing two detent assemblies in position with the launcher/carrier in the carry position.
Figure 3:
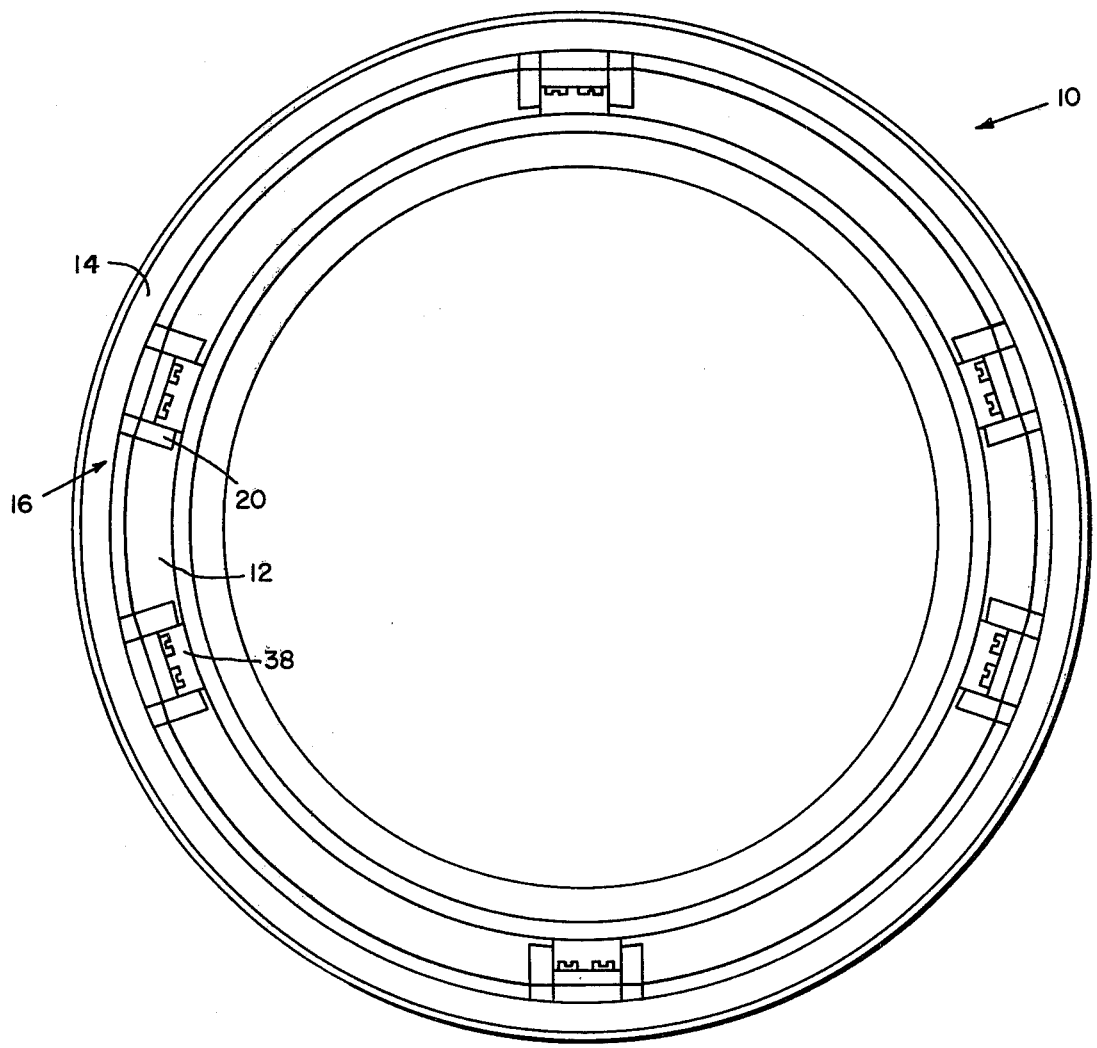
FIG. 3 is an elevational end view of FIG. 2 illustrating the positions of the detent assemblies.

As seen in FIG. 1 a rocket launcher/carrier 10 includes inner and outer launch tubes 12 and 14, respectively. A detent assembly 16 is secured to the inner surface 18 of outer tube 14. The detent assembly includes a housing 20 secured to tube 14 and provided with a groove or cut-away portion 24 to receive the leading edge 26 of the ramp section 28, (tapered portion) of the inner lauch tube 12. A housing includes a forward portion 30 extending over edge 26 of the ramp section 28, a pair of substantially parallel side members 32 and 34 and an aft member 36. A beam spring 38 is secured in section 36 and is provided with a projection 40 at the distal end thereof. As seen in FIG. 3 a plurality of detent assemblies 16 are spaced around the launcher/carrier.

Figure 2:
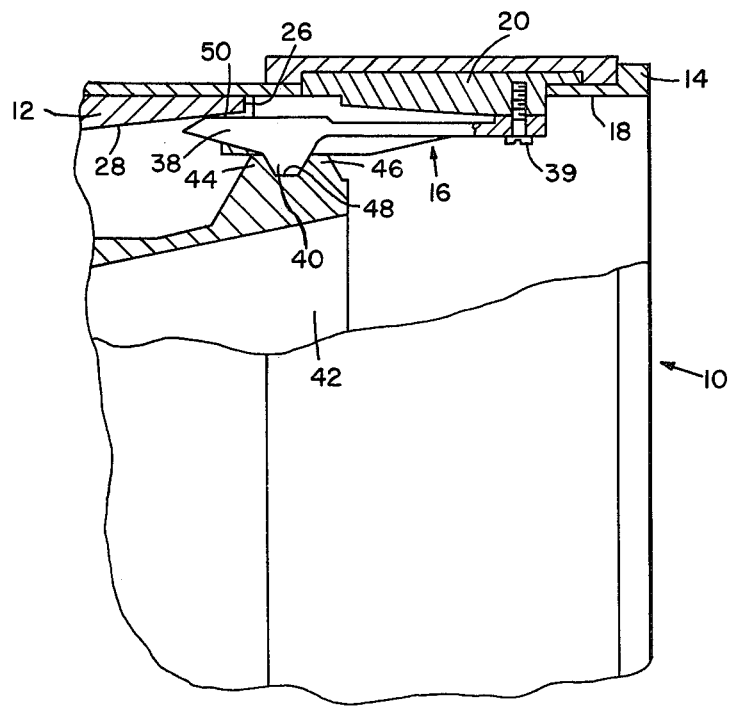
FIG. 2 is a partial elevational sectional view illustrating the projection of the detent assembly engaging the groove in the aft end of the rocket motor while the launcher is collapsed.

As seen in FIG. 2, the missile 42 includes a pair of raised annular surfaces 44 and 46 having a detent groove 48 in between. Projection 40 is extended into groove 48 by engagement of the inner surface 50 of spring 38 with the tapered ramp portion 28 of tube 12. Thus, the missile is secured in the launcher while the launcher is in the collapsed or carry mode.

The launcher/carrier of the present invention may have interlocks on the firing mechanism so that the missile cannot be fired unless the launcher tube is extended and locked in place. The extending of the launcher tube automatically softens the hard-soft detent system by moving the inner launch tube ramp 28 from under the detent projection 40.

Figure 4:
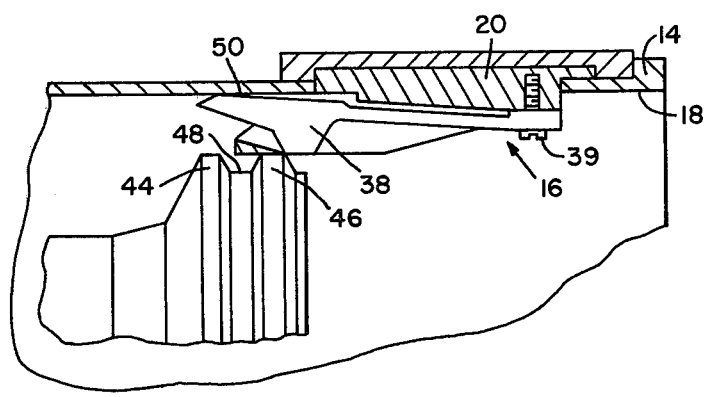
FIG. 4 is a view similar to FIG. 2 illustrating the launcher/carrier in its extended mode and showing the projection of the detent assembly retracted in response to forward movement of the missile.

When the missile is fired, the projection 40 cam out of the detent groove 48 freeing the missile (FIG. 4). The detents being a beam spring with a preload retain the missile in the launcher under handling loads in the ready to fire condition and are released from the detent groove of the missile responsive to forward movement of missile during firing. The automatic hard-soft detent system is configured to have a frontal area that will provide the recoil required to offset forecoil in the system.

I claim:

1. A hard-soft detent assembly for engagement with a detent groove on a missile for releasably securing said missile in a telescoping launcher/carrier having inner and outer launch tubes comprising:
   a. a housing secured to the inner surface of said outer launch tube; and,
   b. engaging means carried in said housing and disposed for releasably engaging said detent groove when said launcher/carrier is in collapsed position whereby said missile is rigidly secured in said launcher/carrier, said engaging means disposed for release of said missile responsive to forward motion of said missile subsequent to ignition thereof and extension of said launcher to extended position.

2. A hard-soft detent system as in claim 1 wherein said engaging means is a beam spring having a projection thereon for engagement with said detent groove.

3. A hard-soft detent system as in claim 2 wherein said housing is provided with a cut-away portion to receive a tapered ramp section of said inner tube therein when said launcher/carrier is retracted, whereby said ramp section engages said projection to extend said projection into said detent groove.

* * * * *